United States Patent
Riska et al.

(10) Patent No.: US 10,022,690 B2
(45) Date of Patent: Jul. 17, 2018

(54) METHOD FOR MIXING FLUIDS

(71) Applicant: NESTE OYJ, Espoo (FI)

(72) Inventors: Anders Riska, Porvoo (FI); Sumela Joona, Porvoo (FI); Johanna Vaittinen, Porvoo (FI)

(73) Assignee: NESTE OYJ, Espoo (FI)

( * ) Notice: Subject to any disclaimer, the term of this patent is extended or adjusted under 35 U.S.C. 154(b) by 212 days.

(21) Appl. No.: 14/737,137

(22) Filed: Jun. 11, 2015

(65) Prior Publication Data

US 2015/0360189 A1   Dec. 17, 2015

(30) Foreign Application Priority Data

Jun. 11, 2014   (EP) .................................... 14171930

(51) Int. Cl.
| | | |
|---|---|---|
| B01J 19/24 | (2006.01) | |
| B01F 5/00 | (2006.01) | |
| B01F 5/04 | (2006.01) | |
| B01F 3/08 | (2006.01) | |
| B01F 15/02 | (2006.01) | |

(52) U.S. Cl.
CPC ........ *B01F 15/0233* (2013.01); *B01F 3/0803* (2013.01); *B01F 3/0861* (2013.01); *B01F 5/0057* (2013.01); *B01F 5/0451* (2013.01); *B01J 19/2405* (2013.01); *B01F 2005/002* (2013.01); *B01F 2215/0088* (2013.01); *B01J 2219/00164* (2013.01)

(58) Field of Classification Search
CPC ........... B01F 15/0233; B01F 2005/002; B01F 5/0057; B01F 5/0451; B01F 2215/0088; B01F 3/0803; B01F 3/0861; B01J 19/2405; B01J 2219/00164
USPC ....................................................... 366/165.2
See application file for complete search history.

(56) References Cited

U.S. PATENT DOCUMENTS

| | | | | |
|---|---|---|---|---|
| 2,616,563 A | * | 11/1952 | Hebb ....................... | B04C 1/00 209/135 |
| 2,707,444 A | * | 5/1955 | Von Loon ............... | F23C 3/008 110/264 |
| 3,064,811 A | * | 11/1962 | Mumper ................... | B04C 5/20 209/716 |
| 3,730,494 A | * | 5/1973 | Sterlini .................. | B01D 47/00 261/122.1 |

(Continued)

FOREIGN PATENT DOCUMENTS

| | | |
|---|---|---|
| EP | 1 741 768 A1 | 1/2007 |
| FR | 2 966 197 A1 | 4/2012 |

(Continued)

OTHER PUBLICATIONS

The extended European Search Report dated Dec. 3, 2014, by the European Patent Office in corresponding European Patent Application No. 1417930.2-1703 (6 pgs).

(Continued)

*Primary Examiner* — Tony G Soohoo

(74) *Attorney, Agent, or Firm* — Buchanan Ingersoll & Rooney PC

(57) ABSTRACT

A method and apparatus for mixing at least two fluids is provided. The method involves using means for providing a spiral stream of a first fluid and a second fluid is injected directly inside the first fluid to achieve effective mixing.

21 Claims, 4 Drawing Sheets

(56) References Cited

U.S. PATENT DOCUMENTS

| | | | | |
|---|---|---|---|---|
| 4,070,250 | A * | 1/1978 | Choi | C10B 49/12 |
| | | | | 201/12 |
| 4,146,359 | A * | 3/1979 | Lumpkin | B01J 15/00 |
| | | | | 110/244 |
| 4,270,975 | A * | 6/1981 | Bennett | B01D 1/06 |
| | | | | 122/488 |
| 4,498,819 | A * | 2/1985 | El-Saie | B01F 5/0057 |
| | | | | 137/896 |
| 4,581,142 | A * | 4/1986 | Fladby | B04C 5/04 |
| | | | | 209/732 |
| 4,606,822 | A * | 8/1986 | Miller | B01F 3/04106 |
| | | | | 209/170 |
| 4,652,363 | A * | 3/1987 | Miller | B04C 5/02 |
| | | | | 209/734 |
| 4,960,525 | A * | 10/1990 | Dalby | B01D 9/004 |
| | | | | 209/729 |
| 5,112,498 | A * | 5/1992 | Davies | B01D 17/04 |
| | | | | 210/708 |
| D415,181 | S * | 10/1999 | Rogers | D15/147 |
| D415,182 | S * | 10/1999 | Rogers | D15/147 |
| 6,183,702 | B1 | 2/2001 | Nguyen et al. | |
| D456,429 | S * | 4/2002 | Rogers | D15/147 |
| 6,655,829 | B1 * | 12/2003 | Vanden Bussche | B01F 5/04 |
| | | | | 366/165.1 |
| 6,863,867 | B2 * | 3/2005 | Vanden Bussche | B01F 5/04 |
| | | | | 422/129 |
| 6,948,705 | B2 * | 9/2005 | Lee | B01D 3/008 |
| | | | | 261/109 |
| 7,160,025 | B2 * | 1/2007 | Ji | B01F 5/0646 |
| | | | | 366/341 |
| 8,440,875 | B1 | 5/2013 | Eizenga | |
| 9,266,035 | B2 * | 2/2016 | Singh | B01D 3/008 |
| 2002/0053287 | A1 | 5/2002 | Natarius | |
| 2004/0125689 | A1 * | 7/2004 | Ehrfeld | B01F 5/04 |
| | | | | 366/165.1 |
| 2009/0201760 | A1 * | 8/2009 | Vorage | B01F 3/0861 |
| | | | | 366/163.1 |
| 2010/0303685 | A1 * | 12/2010 | Kemoun | B01F 5/0057 |
| | | | | 422/257 |
| 2012/0053377 | A1 | 3/2012 | Mizan et al. | |
| 2012/0216450 | A1 | 8/2012 | Dupassieux et al. | |
| 2012/0255223 | A1 | 10/2012 | Kaul et al. | |
| 2013/0022507 | A1 * | 1/2013 | Kobayashi | B01J 19/0013 |
| | | | | 422/129 |
| 2013/0064740 | A1 | 3/2013 | Boyak et al. | |
| 2013/0216442 | A1 | 8/2013 | Brunel et al. | |
| 2015/0360189 | A1 * | 12/2015 | Riska | B01F 5/0057 |
| | | | | 252/183.11 |
| 2016/0346758 | A1 * | 12/2016 | Kress | B01F 5/0057 |

FOREIGN PATENT DOCUMENTS

| | | |
|---|---|---|
| FR | 2 989 006 A1 | 10/2013 |
| SG | 193774 A1 | 10/2013 |

OTHER PUBLICATIONS

The Examination Report dated Feb. 1, 2018, by the Singaporean Patent Office in corresponding Singaporean Application No. 10201503704Q. (4 pages).

* cited by examiner

METHOD FOR MIXING FLUIDS

RELATED APPLICATION(S)

This application claims priority under 35 U.S.C. § 119 to European Patent Application No. 14171930.2 filed in Europe on Jun. 11, 2014, the entire content of which is hereby incorporated by reference in its entirety.

FIELD

The present description relates to mixing fluids. For example, it relates to mixing fluids effectively by injecting fresh fluid feed into a spiral stream of recycled fluid feed.

The method is useful for example in chemical processes where corrosive fresh fluid feeds are mixed into a recycled fluid feed. For example, use is found in processing hydrocarbons, such as diesel range hydrocarbons from renewable source of biological origin, for example from bio oils and fats. The disclosure is also useful in controlling temperature profile of the reactor.

BACKGROUND INFORMATION

Environmental interests and an increasing demand for diesel fuel drive fuel producers to employ more intensively renewable sources in the manufacture of diesel fuel. In the manufacture of diesel fuels based on biological raw materials, e.g., renewable and bio diesel, the main interest has thus far concerned vegetable oils and animal fats comprising triglycerides of fatty acids. Long, straight and mainly saturated hydrocarbons of fatty acids correspond chemically to the hydrocarbons present in diesel fuels.

Plant oils and fats, as well as animal oils and fats can contain 0-30 wt-% of free fatty acids (FFAs). FFAs are formed during enzymatic hydrolysis of triglycerides especially when oil seeds are kept in humid atmosphere. Free fatty acids can also be formed during purification of bio oils and fats, especially during caustic wash, e.g., alkali catalyzed hydrolysis.

The fatty acid composition, size and saturation degree may vary considerably in feed stocks from different origins. The melting point of bio oil or fat is mainly a consequence of the saturation degree. Fats are more saturated than liquid oils and require less hydrogen for hydrogenation of double bonds.

Free fatty acids are very corrosive because of their acidity. They attack against materials they are in contact with which may cause corrosion on equipment used in processes involving FFAs, such as piping and reactors.

FFAs also promote undesirable side reactions. Unsaturated feeds and free fatty acids in bio oils and fats promote the formation of heavy molecular weight compounds, which may cause plugging of the preheating section and decrease catalyst activity and life. Double bonds in unsaturated FFAs also promote various other side reactions, such as oligomerisation/polymerization, cyclisation/aromatisation and cracking reactions. These reactions cause many problems in the process and deactivate catalysts, increase hydrogen consumption and reduce diesel yield.

Fatty acids may also promote the formation of heavy compounds. The boiling range of these heavy compounds is different from the range of diesel fuel and may shorten the life of isomerisation catalyst. Due to the free fatty acids contained in bio oils and fats, the formation of heavy molecular weight compounds are significantly increased compared to triglyceridic bio feeds which have only low amount of free fatty acids (<1%).

EP 1741768 A1 describes a process for the manufacture of diesel range hydrocarbons wherein a feed is hydrotreated in a hydrotreating step and isomerised in an isomerization step and a feed comprising fresh feed containing more than 5 w-% of free fatty acids and at least one diluting agent is hydrotreated at a reaction temperature of 200-400° C., in a hydrotreating reactor in the presence of catalyst, and the volume ratio of the diluting agent to fresh feed is 5-30:1. Hydrodeoxygenation, HDO, step is disclosed as a hydrogenolysis process for removing oxygen from oxygen containing compounds and FFA-feeds.

Free fatty acids are corrosive and they can attack against materials of unit or catalyst and promote some side reactions. Free fatty acids react very efficiently with metal impurities producing metal carboxylates, which promote undesirable side reaction chemistry.

The corrosiveness of FFAs present in renewable sources of hydrocarbons has limited use of renewable sources in manufacturing diesel fuel. The high concentration of FFAs in fresh feeds prevents feeding high concentrations of fresh feed into recycle feed without exposing for example feed system, heat exchanger and reactor to corrosion. The risk of corrosion is, for example, high above the reaction bed where fresh feed is mixed with the recycle, such as at HDO.

Corrosion rate is affected by factors such as materials used in the process, operating temperature, organic acid concentration and sulphide formation.

Undesired oxygen may be removed from fatty acids or their esters by deoxygenation reactions. The deoxygenation of bio oils and fats, which are oils and fats based on biological material, to produce hydrocarbons suitable as diesel fuel products, may be carried out by catalytic hydrotreating.

During hydrotreating, for example hydrodeoxygenation, oxygen containing groups are reacted with hydrogen and removed as water formed in the reaction. This reaction can require rather high amounts of hydrogen. Due to the highly exothermic nature of these reactions, the control of reaction heat can be important. Impure plant oil/fat or animal fat/oil, high reaction temperatures, insufficient control of reaction temperature or low hydrogen availability in the feed stream may cause unwanted side reactions, such as cracking, polymerisation, ketonisation, cyclisation and aromatisation, and coking of the catalyst. These side reactions also decrease the yield and the properties of the obtained diesel fraction.

EP 1741768 A1 also describes an improved process for the manufacture of diesel range hydrocarbons from bio oils and fats, wherein the hydrotreatment of triglyceride feedstock containing free fatty acids is carried out using dilution of fresh feed and reduced reaction temperature. The dilution agent is selected from hydrocarbons and recycled product of the process, i.e., product recycle or mixtures thereof. A ratio of at least 5:1 (recycle:fresh) significantly decreased the formation of high molecular weight products, when the feedstock containing 10 wt-% of free fatty acids (calculated from fresh oil) was used. Thus using at least 5:1 or 4:1 recycle ratio and reduced reaction temperature, free fatty acids can be processed without the need for deacidification and high quality hydrocarbons suitable for the diesel fuel pool were obtained.

When a feedstock with high levels of FFAs or other organic acids is used, it can be desirable to protect the system from corrosion. For example, the feed system, heat exchanger, and/or reactors are affected most as they are the first to be in contact with the feed with the highest FFA content. Controlling corrosion by corrosion-resistant materials is possible but results into high costs and extensive modifications of the units of the refinery.

Corrosion prevention includes previously been achieved by cladding the exposed surfaces, adding a corrosion inhibitor, anti-corrosion agents, or changing the materials (corrosion resistant material) used in the exposed surfaces. These methods are disclosed for example from US 2012/0053377.

US 2012/0216450 describes a method of converting feeds from renewable sources in co-processing with a petroleum feed using a catalyst based on nickel and molybdenum.

U.S. Pat. No. 8,440,875 describes a method of making a diesel fuel from a renewable feedstock. Ammonia or an amine compound is used to neutralize the organic acids in the renewable feedstock. The ammonia or amine compound should be removed from the product mixture before the isomerization zone so that it does not affect the isomerization catalyst. The use of ammonia or amine compounds could allow for the metallurgy reductions in the process equipment.

US 2012/0255223 discloses a process for conversion of FFA containing oils to biodiesel by converting high FFA containing feed stocks (FFA 20-85%) without pretreatment or purification to biodiesel in the presence of macro reticular and gel type acidic heterogeneous resin followed by transesterification in presence of homogeneous basic catalyst and separation of biodiesel and glycerin.

FR 2989006 A1 discloses a catalytic reactor with a quench device provided with tangential injection of a quench fluid.

Despite some attempts in the field to allow mixing corrosive fresh fluid feeds into recycled fluid feeds, there still remains a need for new methods and apparatuses that allow efficient mixing of the fresh and recycled feeds without need for extensive protection or diluting or neutralising agents. For example, high FFA feeds in manufacturing diesel range hydrocarbons from renewable source have previously been difficult or impossible to feed into recycled process stream in a cost-effective way without extensive use of additional neutralising or diluting agents, conversion, or protection of reactor parts by protective layers.

SUMMARY

According to an exemplary aspect, disclosed is a method of mixing fluids in a fluid mixer, the fluid mixer comprising a first inlet, a second inlet, an outlet, and a substantially cylindrical mixing chamber, the mixing chamber comprising a wall, a top plate, and a bottom plate, and the method comprising:

passing a first fluid stream into the mixing chamber through the first inlet, the first inlet having openings in the top plate and inside the mixing chamber, an outer wall of the first inlet extending to the wall of the mixing chamber and descending to the bottom of the mixing chamber;

providing a spiral stream of the first fluid inside the mixing chamber through the first inlet, the first inlet descending to the mixing chamber in the form of a ramp or a pipe, and forming an asymmetry to the cylindrical shape to enhance spiral stream in the mixing chamber;

injecting through the second inlet, and tangential to the wall of the mixing chamber, a second fluid into the spiral stream of the first fluid such that the concentration of the second fluid decreases towards the wall of the mixing chamber; and directing the spiral stream of the fluids to the exterior of the mixing chamber as a vortex through the outlet, the outlet being provided in the bottom plate, and the outlet being concentric with the spiral flow axis.

According to an exemplary aspect, disclosed is a fluid mixer comprising:

a substantially cylindrical mixing chamber being defined by a wall, a top plate, and a bottom plate;

a first inlet for passing a first fluid stream into the mixing chamber, the first inlet having openings in the top plate and inside the mixing chamber, an outer wall of the first inlet extending to the wall of the mixing chamber and descending to the bottom of the mixing chamber, the first inlet being configured to provide a spiral stream of the first fluid inside the mixing chamber, the first inlet descending to the mixing chamber in the form of a ramp or a pipe, and forming an asymmetry to the cylindrical shape to enhance spiral stream in the mixing chamber;

a second inlet for injecting tangentially to the wall of the mixing chamber a second fluid into the spiral stream of the first fluid such that the concentration of the second fluid decreases towards the wall of the mixing chamber, the second inlet optionally comprising a nozzle with an inner sleeve for protecting the second inlet from corrosion; and an outlet in the bottom plate, the fluid mixer being configured to direct the spiral stream of the fluids to the exterior of the mixing chamber as a vortex through the outlet, the outlet being concentric with the spiral flow axis.

DETAILED DESCRIPTION

Figure 1:
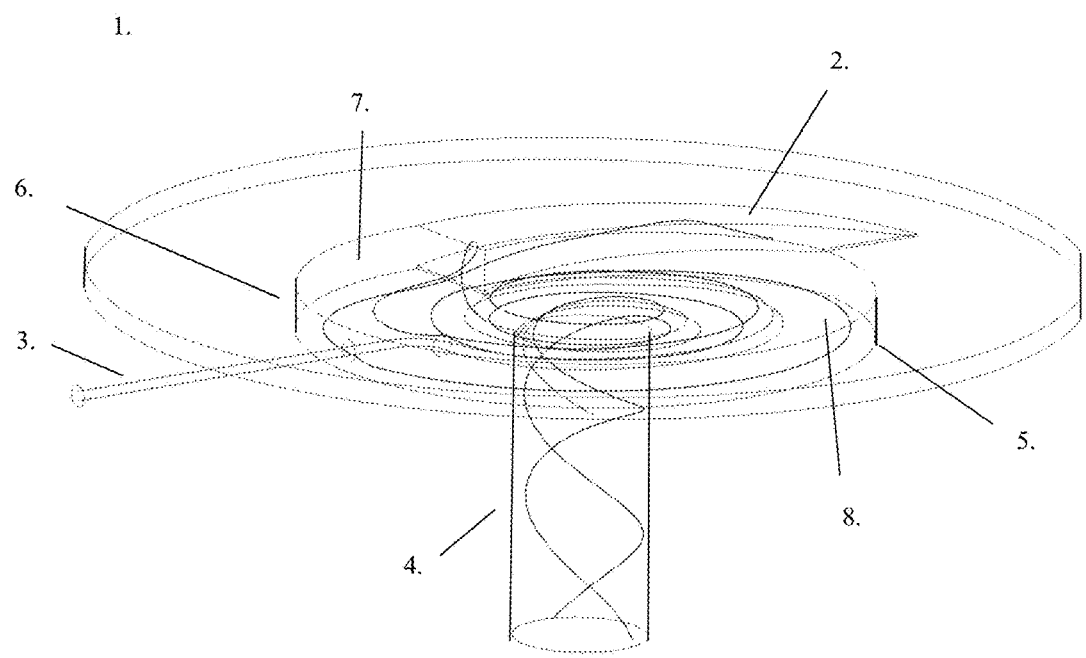
FIG. 1 illustrates a fluid mixer design and the stream lines entering from the mixing chamber and injected through the injection nozzle, according to an exemplary aspect.

According to an exemplary aspect, it is possible to at least alleviate the above shortcomings by providing a mixing method and a fluid mixer according to the aspects of the disclosure at least for reducing the corrosion problem in reactor systems and/or for enabling increasing the FFA content in the feed of HDO reactor.

Disclosed is an effective method of mixing fluids and a fluid mixer. Accordingly, referring to FIG. 1, the first aspect of the disclosure provides a method of mixing fluids in a fluid mixer 1, the fluid mixer 1 comprising a first inlet 2, a second inlet 3, an outlet 4, and a substantially cylindrical mixing chamber 5, the mixing chamber comprising a wall 6, a top plate 7, and a bottom plate 8, and the method comprising passing a first fluid stream into the mixing chamber 5 through the first inlet 2, the first inlet 2 having openings in the top plate 7 and inside the mixing chamber 5, an outer wall of the first inlet 2 extending to the wall 6 of the mixing chamber 5 and descending to the bottom of the mixing chamber 5, providing a spiral stream of the first fluid inside the mixing chamber 5 through the first inlet 2, the first inlet 2 descending to the mixing chamber 5 in the form of a ramp or a pipe, and forming an asymmetry to the cylindrical shape to enhance spiral stream in the mixing chamber 5, injecting through the second inlet 3, and tangential to the wall 6 of the mixing chamber 5, a second fluid into the spiral stream of the first fluid such that the concentration of the second fluid decreases towards the wall 6 of the mixing chamber 5, and directing the spiral stream of the fluids to the exterior of the mixing chamber 5 as a vortex through the outlet 4, the outlet 4 being provided in the bottom plate 8, and the outlet 4 being concentric with the spiral flow axis.

Referring to FIG. 1, according to another aspect there is provided a fluid mixer 1 for mixing fluids comprising a substantially cylindrical mixing chamber 5 being defined by a wall 6, a top plate 7, and a bottom plate 8, a first inlet 2 for passing a first fluid stream into the mixing chamber 5, the first inlet 2 having openings in the top plate 7 and inside the mixing chamber 5, an outer wall of the first inlet 2 extending to the wall 6 of the mixing chamber 5 and descending to the bottom of the mixing chamber 5, the first inlet 2 being configured to provide a spiral stream of the first fluid inside the mixing chamber 5, the first inlet 2 descending to the mixing chamber 5 in the form of a ramp or a pipe, and forming an asymmetry to the cylindrical shape to enhance spiral stream in the mixing chamber 5, a second inlet 3 for injecting tangentially to the wall 6 of the mixing chamber 5 a second fluid into the spiral stream of the first fluid such that the concentration of the second fluid decreases towards the wall 6 of the mixing chamber 5, the second inlet 3 optionally comprising a nozzle with an inner sleeve for protecting the second inlet 3 from corrosion and an outlet 4 in the bottom plate 8, the fluid mixer being configured to direct the spiral stream of the fluids to the exterior of the mixing chamber 5 as a vortex through the outlet 4, the outlet 4 being concentric with the spiral flow axis.

An exemplary aspect of the method and the fluid mixer is the capability to effectively mix into the first fluid a second fluid. The second fluid may have a high concentration of at least one corrosive agent. Prior processes involving mixing corrosive fluids have required protecting reactors by expensive protecting layers. Alternatively, corrosive fluids have been injected in low concentrations to avoid contact of high concentration of corrosive agents with the mixer or reactor surfaces, for example, the mixing chamber walls. The effective mixing of the present method removes the need for extensive protecting layers in the reactor shell and in the main distributor (below the quench box). Additionally, extensive use of diluting fluids can be avoided. With prior technology only fresh feed with FFA contents of less than about 10% has been possible without additional protection from corrosion.

Without limiting to these exemplary aspects, the present method enables mixing second fluid having high concentration FFAs. High FFA content of some hydrocarbon sources of biological origin includes previously limited extensive use of highly feasible feedstocks in refinery. The increased use of feedstocks with higher FFA content includes a positive impact on feasibility of refinery units. The method can be desirable in HDO reactor optionally involving multiple beds. The method allows using high FFA raw material streams that are inexpensive and attractive sources for bio fuel production, but which have previously been difficult or impossible to use because of their corrosive nature. The present mixing method allows up to 100% FFA content in the second fluid.

Further, an exemplary aspect of the method is efficient mixing of the fluid streams into a more homogeneous stream which helps to maintain optimal temperature profile in the reactor and helps to avoid unwanted side reactions.

The mixing method and the fluid mixer according to the disclosure allows an assembly which is very compact, making the fluid mixer suitable to be installed, and the mixing method to be used, in existing reactors with few modifications in the reactor. The compact structure is for example, desirable in multibed reactors having several points of injection for the fresh fluid comprising a corrosive agent.

The present mixing method and fluid mixer are, for example, advantageous when used in hydrotreating where product recycle or another dilution agent in the hydrotreatment step is used as the first fluid and the second fluid includes fresh feed with high FFA content.

The fluid mixer allows effective mixing without using mixing blades or similar for mixing the fluids. The fluid mixer can be implemented as a compact unit that can be easily fitted into reactors.

The present disclosure provides a novel mixing method and a fluid mixer. The modified mixing chamber reduces the corrosion problem and allows using increased FFA content in the fresh feed and in the mixed feed exiting the mixing chamber.

The majority of the information related to the organic acid corrosion mechanism in high temperatures without water phase has been obtained from the studies related to naphthenic acid corrosion (NAC). Fatty acids, similar to naphthenic acids, are carboxylic acids and therefore the corrosion reactions for them are similar. Because fatty acids are protic solvents and they can solvate anions, impurities includes an effect on the corrosion mechanism. Without being bound to any theory, the main corrosion reaction for carboxylic acids is considered to be

$$Fe + 2RCOOH \rightarrow Fe(RCOO)_2 + H_2 \quad (1)$$

Because the corrosion product is very soluble in hot hydrocarbon stream, there is usually no protective film or corrosion scale on steel surfaces of the system. The soluble corrosion product can react with $H_2S$ present in the process to form poorly soluble FeS deposits that cause plugging problems.

Without being bound to any theory, formation of FeS deposits may occur according to the reaction

$$Fe(RCOO)_2 + H_2S \rightarrow FeS + 2RCOOH \quad (2)$$

Feed nozzle of the second fluid, as well as internal piping including quench box for the second catalyst bed can become in contact with fresh feed at high temperatures.

The mixing chamber includes substantially cylindrical shape. Cylindrical shape is exemplary as it enhances spiral flow inside the mixing chamber. However, the first inlet forms asymmetry to the cylindrical shape as the inlet enters the mixing chamber near the wall of the mixing chamber, as is seen in FIG. 1. Consequently, the shape of the mixing chamber is not perfectly cylindrical.

The first inlet provides a spiral stream of the first fluid inside the mixing chamber. The first inlet is in the form of a pipe or a ramp, which descends from outside the mixing chamber through the top plate and to the bottom of the mixing chamber, thereby forming a curved passage for the first fluid to enter the mixing chamber near the wall of the mixing chamber. The spiral movement of the first fluid flow initially continues near the wall of the mixing chamber until the flow reaches the entry point of the first fluid, i.e., the end of the first inlet. After this point, the stream begins the second round of rotation and continues the second and subsequent cycles closer to the center of the mixing chamber, thus forming a spiral stream. The stream continues spiral movement inside the mixing chamber as the first fluid enters through the first inlet, as well as the geometry of the mixing chamber, cause the stream to rotate and flow towards the center of the mixing chamber wherein the outlet in the bottom plate is situated at the center of the mixing chamber.

The second fluid is injected tangential to the wall of the mixing chamber. The tangential injection may be accomplished by injecting the second fluid through a fluid inlet nozzle directed downstream. The second inlet may enter the mixing chamber through the wall of the mixing chamber, for example as a pipe with a nozzle which opens into the stream of the first fluid. As the second fluid is injected inside the spiral stream of the first fluid, the concentration of the second fluid decreases towards the wall of the mixing chamber as it mixes with the first fluid flowing around the second inlet, as well as flowing between the second inlet and the wall of the mixing chamber. The concentration of the second fluid at the wall of the mixing chamber may be as low as below 1 wt-%.

The mixed fluids exit the mixing chamber through an outlet in the bottom plate as a vortex. The outlet is provided in the bottom plate and it is concentric with both the spiral flow axis to achieve enhanced mixing.

In an exemplary embodiment, the outlet opens into a reactor comprising a wall. As the mixed fluids exit the mixing chamber, the rotational stream of fluids forms a vortex which extends inside the reactor below the fluid mixer essentially concentrically with the reactor. As is seen in FIG. 1, efficient mixing of the fluids is obtained and, consequently, very high concentrations of corrosive agents, such as FFA, in the second fluid can be injected without exposing the fluid mixer wall directly to the corrosive second fluid. The opening of the outlet may be circular and concentric to the mixing chamber.

In an exemplary embodiment, the first inlet includes a height corresponding to the height of the mixing chamber at the end of the inlet entering the mixing chamber. In an exemplary embodiment, the inlet is a ramp and the cross section of the ramp opening is rectangular having the base and the top edges that are longer than the side edges. The circumferential length of the first inlet, such as a ramp, is less than a full circle, for example, one fourth of a circle. In another exemplary embodiment, the inlet is tubular, e.g., a pipe. In yet another exemplary embodiment, the first inlet is a tangentially directed downcomer.

In an exemplary embodiment, the second inlet may comprise a nozzle with an inner sleeve, for example, if the temperature is high, such as exceeds approx. 225° C. This provides additional protection for the second inlet to prevent corrosion caused by the corrosive agent while it is injected into the recycle feed and before it is effectively mixed with the recycle feed by the present fluid mixer, making it less corrosive.

In an exemplary embodiment, the second fluid includes an agent which is corrosive. The corrosive nature of the second fluid may affect the walls of the mixing chamber, the reactor walls, or both. The corrosive nature of the second fluid prevents injecting it in high concentration directly inside the mixing chamber or to the reactor in high concentrations without using the present method to effectively mix the fluids. Consequently, in comparative methods the ratio of the recycle feed to the fresh feed are kept high because ineffective mixing of the feeds has made it necessary to keep the amount of the corrosive fresh feed low as a precaution in order to control exposure of the system to corrosive agents in the fresh feed.

In an exemplary embodiment, the volume ratio of the first fluid to the second fluid in the fluid stream exiting the mixing chamber is from 1:1 to 15:1, for example, from 3:1 to 6:1, such as 1:1, 2:1, 3:1, 4:1, 5:1, 6:1, 7:1, 8:1, 9:1, 10:1, 11:1, 12:1, 13:1, 14:1 or 15:1.

The first fluid can be fed from 50 to 300 t/h, such as 50, 60, 70, 80, 90, 100, 110, 120, 130, 140, 150, 160, 170, 180, 190, 200, 210, 220, 230, 240, 250, 260, 270, 280, 290 or 300 t/h. The second fluid can be fed from 0.5 to 60 t/h, such as 0.5, 0.6, 0.7, 0.8, 0.9, 1, 2, 3, 4, 5, 6, 7, 8, 9, 10, 11, 12, 13, 14, 15, 16, 17, 18, 19, 20, 25, 30, 35, 40, 45, 50, 55 or 60 t/h. The flow rates of the first and the second fluid may be selected such that the above mentioned volume ratios for the first and the second fluids are obtained. In case of multiple beds, the feed of the second fluid may be divided accordingly depending on the number of beds: for two beds, and a total flow rate of 60 t/h for the second fluid, 30 t/h feeds for each bed may be used; for three beds the second fluid feed may be divided into three 20 t/h feeds for each bed, accordingly. Optionally, the flow rate of the second feed may vary in the individual beds of a multibed reactor as long as the total flow rate of the second feed is kept within the above range.

In an exemplary embodiment, the second fluid includes free fatty acids as a corrosive agent up to 100% w/w, for example, up to 5, 10, 15, 20, 25, 30, 35, 40, 45, 50, 55, 60, 65, 70, 75, 80, 85, 90, or 95% w/w.

In an exemplary embodiment, the second fluid includes one or more free fatty acid distillates such as palm fatty acid distillate and/or soya free fatty acid distillate; one or more free fatty acid containing bio based feedstock such as crude and refined palm based oil, technical corn oil, tall oil, seed oil, animal fat, waste cooking oil, jatropha curcas oil, fish oil, microbial oil, and/or algae oil; by-products from fatty acid methyl ester and bio based chemicals production and/or oil derived from ligno-cellulosic biomass; and/or one or more lower molecular weight acids containing bio based feedstock such as pyrolysis oil and/or sludge palm oil.

In an exemplary embodiment, the flow rate of the first fluid is higher than the flow rate of the second fluid at the points of entry of the fluids into the mixing chamber such that the fluids rotate inside the mixing chamber primarily because of the momentum of the first fluid. For example, the flow inside the mixing chamber is controlled by injecting the second fluid into and concurrent to the first fluid such that the second fluid does not touch the wall of the mixing chamber.

In an exemplary embodiment, the flow rates of the first and the second fluid are selected such that the spiral flow rotates at 0.5-2.0 r/s inside the mixing chamber.

In an exemplary embodiment, the second fluid is injected into the first fluid through an opening in a nozzle which is surrounded by the first fluid. The first fluid streams through the mixing chamber in a spiral stream and surrounds the space into which the second fluid is injected, thereby protecting the mixing chamber wall from the corrosive agents present in the second fluid. The nozzle for the second fluid may be positioned inside the mixing chamber such that the nozzle directs the second fluid inside the rotating stream which originates predominantly or exclusively from the first fluid.

In an exemplary embodiment, the height of the mixing chamber is smaller than its diameter, for example, the height to diameter ratio is from 0.006 to 0.3, for example from 0.03 to 0.15, such as 0.006, 0.007, 0.008, 0.009, 0.01, 0.015, 0.02, 0.025, 0.026, 0.027, 0.028, 0.029, 0.03, 0.031, 0.032, 0.033, 0.034, 0.035, 0.04, 0.045, 0.05, 0.055, 0.06, 0.065, 0.07, 0.075, 0.08, 0.085, 0.09, 0.095, 0.1, 0.11, 0.12, 0.13, 0.14, 0.141, 0.142, 0.143, 0.144, 0.145, 0.146, 0.147, 0.148, 0.149, 0.15, 0.151, 0.152, 0.153, 0.154, 0.155, 0.156, 0.157, 0.158, 0.159, 0.16, 0.17, 0.18, 0.19, 0.2, 0.21, 0.22, 0.23, 0.24, 0.25, 0.26, 0.27, 0.28, 0.29 or 0.3. Thus, the mixing can be accomplished with a fluid mixer which is compact and the mixer or mixing chamber can be installed into existing reactors having limited space.

In an exemplary embodiment, the method is for mixing fluids in a downflow reactor or in a reactor comprising multiple beds.

In an exemplary embodiment, the method is for mixing FFA containing renewable hydrocarbon source of biological origin as the second fluid and incoming process feed as the first stream to feed reactants into a HDO reactor.

In an exemplary embodiment, the second fluid includes up to 100% FFA, for example, up to 5, 10, 15, 20, 25, 30, 35, 40, 45, 50, 55, 60, 65, 70, 75, 80, 85, 90, or 95% w/w. The method produces very efficient mixing and allows feeding second fluids comprising high concentration of corrosive agent, such as FFA.

In one aspect, the substantially cylindrical mixing chamber of the fluid mixer is defined by a wall, a top plate, and a bottom plate. The fluids are mixed inside this defined space by the effect of the rotating first fluid into which the second fluid is injected.

The fluid mixer is configured to direct the spiral stream of the fluids to the exterior of the mixing chamber as a vortex through the outlet in the bottom plate, the outlet being concentric with the spiral vortex axis.

As the second fluid is injected inside the first fluid and tangentially to the wall of the mixing chamber, the second fluid does not significantly contact the wall of the mixing chamber. The second fluid may comprise a corrosive agent which may corrode the wall. It is thus exemplary to avoid contacting the second fluid with the wall of the mixing chamber in order to prevent corrosion in said wall. The flow of the second fluid may be controlled such that sufficient mixing is obtained, depending on the type of the second fluid, as well as for example the shape of the mixing chamber. The inlet for the second fluid may enter the mixing chamber through the wall of the mixing chamber.

The opening in the bottom plate of the mixing chamber directs the spiral flow of the fluids outside the mixing chamber. As the fluids exit the mixing chamber to exterior, a vortex of the fluids is formed in which the mixing of the fluids continues with the content of the fluids in the reactor space. When the outlet opens into a reactor being concentric with the mixing chamber.

In one aspect, the second inlet is directed downstream and separated from the wall of the mixing chamber. This further enhances mixing and avoids direct contact between the wall and the second fluid.

In one aspect, the outlet is circular and has a diameter smaller than the diameter of the mixing chamber. This yields efficient discharge of the fluids and enhances spiral stream inside the mixing chamber.

In one aspect, the second fluid includes a corrosive agent. In one aspect, the corrosive agent is renewable feedstock having more than 10% FFA. The FFA content may be as high as 100%.

In one aspect, the fluid mixer is for use in the mixing method.

In one aspect, the method is for hydrotreating renewable feedstock having more than 10% free fatty acid.

In one aspect, in the fluid mixing method the above fluid mixer is used.

EXAMPLES

The following examples are provided to illustrate various aspects of the present disclosure. They are not intended to limit the disclosure.

Example 1—The Fluid Mixer

The maximum FFA content of the feed was investigated assuming that the whole fluid mixer material can tolerate 100% FFA. The reactor wall material is not changed and no additional protective layers are used in the reactor. Therefore, the fluid mixer is designed such that the FFA content near the reactors walls does not exceed 12 w-%. An embodiment of a fluid mixer according to the disclosure is shown in FIG. 1.

Example 2

In this example the flow of fluids inside the fluid mixer was simulated. The first fluid enters the mixer at 140 t/h from the top and the second fluid is injected into the stream inside the mixer (see FIG. 1).

Figure 2:
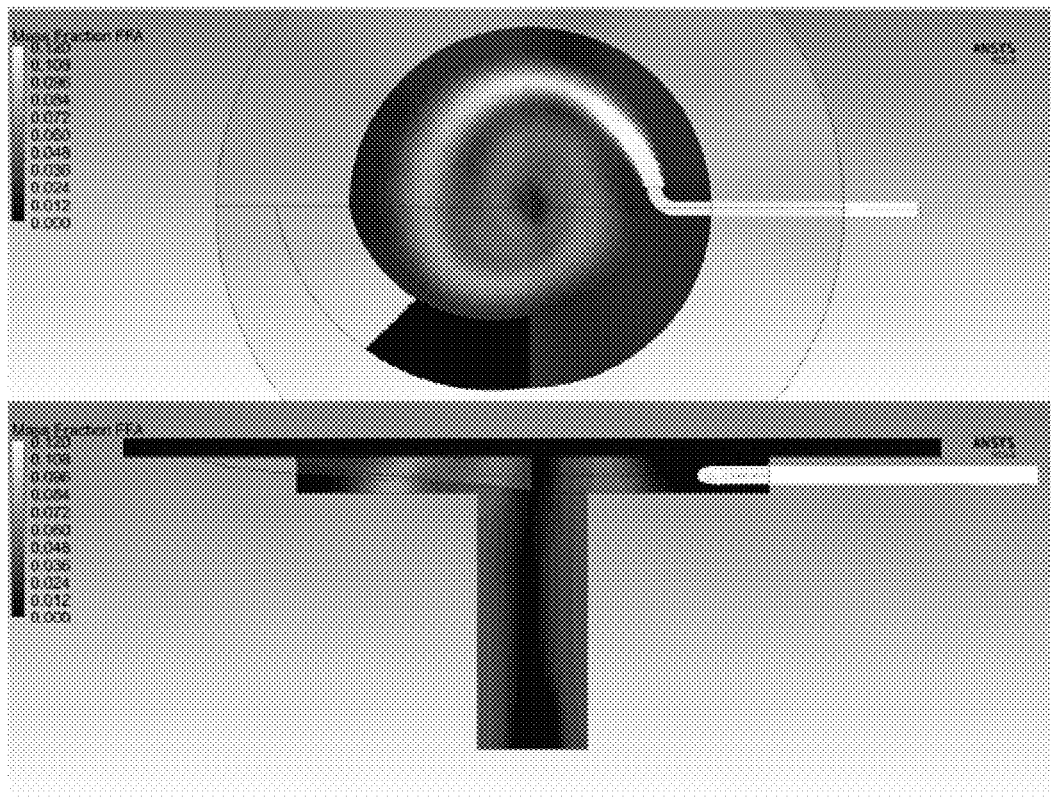
FIG. 2 discloses an FFA mass fraction field for the design of FIG. 1 scaled 0-12 w-% of FFA, with a 50 w-% concentration of FFA in the injected fluid, according to an exemplary aspect.
Figure 3:
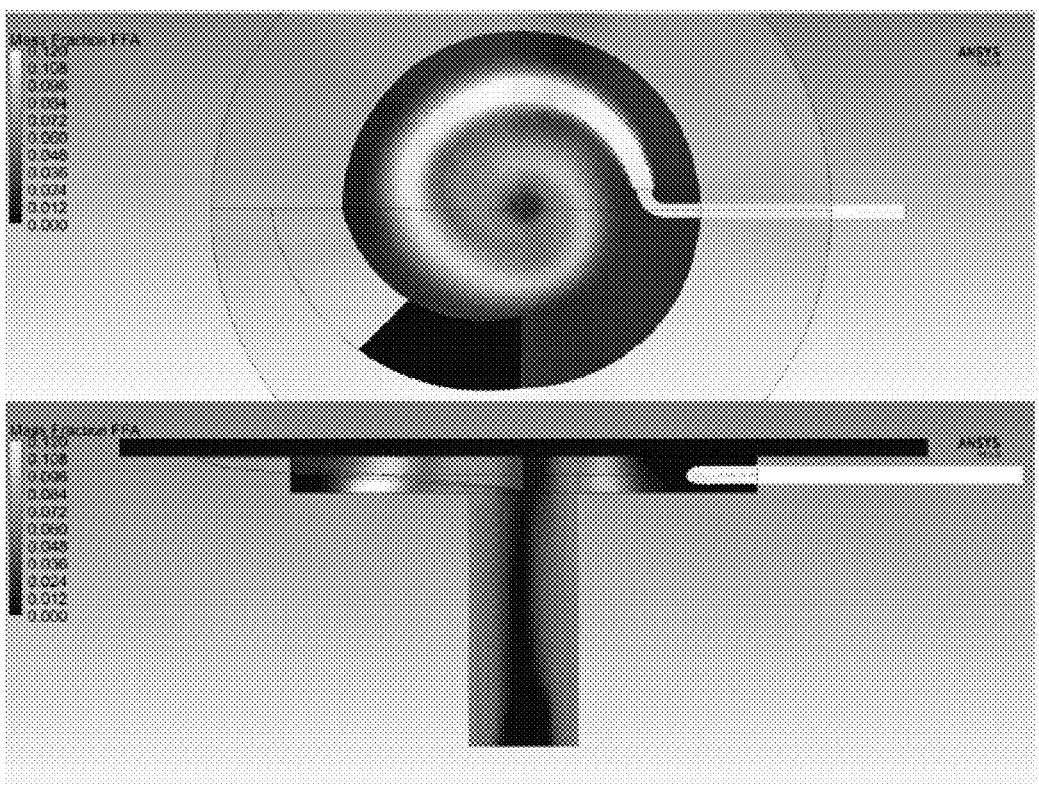
FIG. 3 discloses an FFA mass fraction field for the design of FIG. 1 scaled 0-12 w-% of FFA, with a 80 w-% concentration of FFA in the injected fluid, according to an exemplary aspect.
Figure 4:
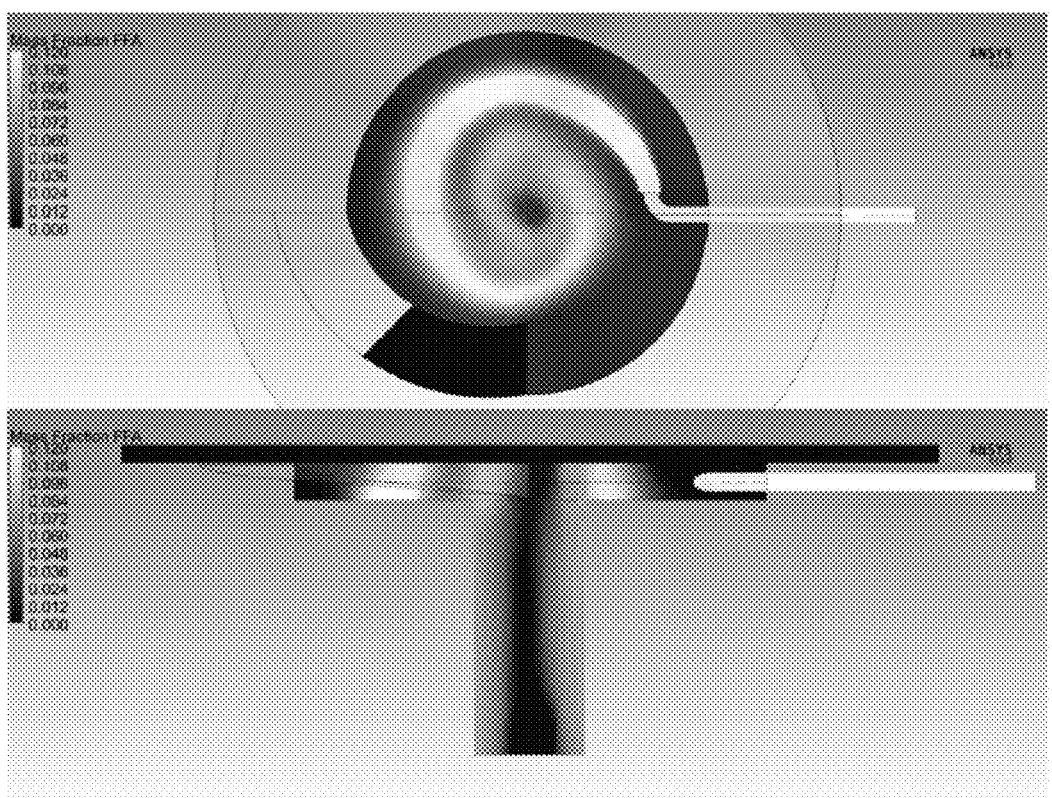
FIG. 4 discloses an FFA mass fraction field for the design of FIG. 1 scaled 0-12 w-% of FFA, with a 100 w-% concentration of FFA in the injected fluid, according to an exemplary aspect.

In order to increase the FFA concentration in the quench inlet, i.e., the second inlet, the design shown in FIG. 1 was simulated. FFA feed concentrations of 50, 80 and 100 w-% were used. FIG. 2-4 shows the FFA mass fraction in scale 0-12 w-%. Concerning the 12 w-% FFA limit, 100 w-% FFA in the second fluid is acceptable if the walls can tolerate max. 8 w-% or 12 w-% depending on the quench box material.

CFD simulations of the FFA distribution inside the fluid mixer in a HDO reactor were run. The simulations demonstrated that the proposed fluid mixer enables efficient mixing of the first fluid and a corrosive second fluid. Walls can tolerate max. 8 w-% or 12 w-% depending on the quench box material, based on corrosion experiments.

The simulation results show that up to 100% FFA content can be used in the second fluid without contact exceeding the corrosive limit.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of mixing fluids in a fluid mixer, the fluid mixer comprising a first inlet, a second inlet, an outlet, and a substantially cylindrical mixing chamber, the mixing chamber comprising a wall, a top plate, and a bottom plate, and the method comprising:
  passing a first fluid stream into the mixing chamber through the first inlet, the first inlet having openings in the top plate and inside the mixing chamber, an outer wall of the first inlet extending to the wall of the mixing chamber and descending to the bottom of the mixing chamber;
  providing a spiral stream of the first fluid inside the mixing chamber through the first inlet, the first inlet descending to the mixing chamber in the form of a ramp or a pipe, and forming an asymmetry to the cylindrical shape to enhance spiral stream in the mixing chamber;

injecting through the second inlet, and tangential to the wall of the mixing chamber, a second fluid into the spiral stream of the first fluid such that the concentration of the second fluid decreases towards the wall of the mixing chamber; and directing the spiral stream of the fluids to the exterior of the mixing chamber as a vortex through the outlet, the outlet being provided in the bottom plate, and the outlet being concentric with the spiral flow axis.

2. The method as claimed in claim 1, wherein the first inlet has a height corresponding to the height of the mixing chamber.

3. The method as claimed in claim 1, wherein the second inlet includes a nozzle with an inner sleeve for protecting the second inlet from corrosion.

4. The method as claimed in claim 1, wherein the second fluid includes an agent which is corrosive.

5. The method as claimed in claim 1, wherein the volume ratio of the first fluid to the second fluid in the fluid stream exiting the mixing chamber is from 1:1 to 15:1.

6. The method as claimed in claim 1, wherein the second fluid comprises:
one or more free fatty acid distillates,
one or more free fatty acid containing bio based feedstock,
by-products from fatty acid methyl ester and bio based chemicals production and/or oil derived from lignocellulosic biomass, and/or
one or more lower molecular weight acids containing bio based feedstock.

7. The method as claimed in claim 1, wherein the flow rate of the first fluid is higher than the flow rate of the second fluid.

8. The method as claimed in claim 1, wherein the flow inside the mixing chamber is controlled by injecting the second fluid into and concurrent to the first fluid such that the second fluid does not touch the wall of the mixing chamber.

9. The method as claimed in claim 1, wherein the spiral flow rotates from 0.5 to 2 r/s inside the mixing chamber.

10. The method as claimed in claim 1, wherein the first fluid is fed 50-300 t/h and the second fluid is fed 0.5-20 t/h.

11. The method as claimed in claim 1, wherein the height of the mixing chamber is smaller than its diameter.

12. The method as claimed in claim 1, wherein the mixing of fluid is extended inside a downflow reactor or a reactor comprising multiple beds.

13. The method as claimed in claim 1, wherein the second fluid contains free fatty acid containing renewable hydrocarbon source of biological origin and the first fluid contains incoming process feed.

14. The method as claimed in claim 1, wherein the second fluid includes up to 100% w/w free fatty acid.

15. The method as claimed in claim 1, wherein the method is conducted using a fluid mixer comprising:
a substantially cylindrical mixing chamber being defined by a wall, a top plate, and a bottom plate;
a first inlet for passing a first fluid stream into the mixing chamber, the first inlet having openings in the top plate and inside the mixing chamber, an outer wall of the first inlet extending to the wall of the mixing chamber and descending to the bottom of the mixing chamber, the first inlet being configured to provide a spiral stream of the first fluid inside the mixing chamber, the first inlet descending to the mixing chamber in the form of a ramp or a pipe, and forming an asymmetry to the cylindrical shape to enhance spiral stream in the mixing chamber;
a second inlet for injecting tangentially to the wall of the mixing chamber a second fluid into the spiral stream of the first fluid such that the concentration of the second fluid decreases towards the wall of the mixing chamber, the second inlet optionally comprising a nozzle with an inner sleeve for protecting the second inlet from corrosion; and
an outlet in the bottom plate, the fluid mixer being configured to direct the spiral stream of the fluids to the exterior of the mixing chamber as a vortex through the outlet, the outlet being concentric with the spiral flow axis.

16. The method as claimed in claim 1, wherein the volume ratio of the first fluid to the second fluid in the fluid stream exiting the mixing chamber is from 3:1 to 6:1.

17. The method as claimed in claim 1, wherein the second fluid comprises:
palm fatty acid distillate and/or soya free fatty acid distillate,
crude and refined palm based oil, technical corn oil, tall oil, seed oil, animal fat, waste cooking oil, jatropha curcas oil, fish oil, microbial oil, and/or algae oil, and/or
pyrolysis oil and/or sludge palm oil.

18. The method as claimed in claim 1, wherein the height of the mixing chamber is smaller than its diameter, wherein the height to diameter ratio is from 0.03 to 0.15.

19. The method as claimed in claim 1, wherein the second fluid includes up to 95% w/w free fatty acid.

20. A fluid mixer comprising:
a substantially cylindrical mixing chamber being defined by a wall, a top plate, and a bottom plate;
a first inlet for passing a first fluid stream into the mixing chamber, the first inlet having openings in the top plate and inside the mixing chamber, an outer wall of the first inlet extending to the wall of the mixing chamber and descending to the bottom of the mixing chamber, the first inlet being configured to provide a spiral stream of the first fluid inside the mixing chamber, the first inlet descending to the mixing chamber in the form of a ramp or a pipe, and forming an asymmetry to the cylindrical shape to enhance spiral stream in the mixing chamber;
a second inlet for injecting tangentially to the wall of the mixing chamber a second fluid into the spiral stream of the first fluid such that the concentration of the second fluid decreases towards the wall of the mixing chamber, the second inlet optionally comprising a nozzle with an inner sleeve for protecting the second inlet from corrosion; and
an outlet in the bottom plate, the fluid mixer being configured to direct the spiral stream of the fluids to the exterior of the mixing chamber as a vortex through the outlet, the outlet being concentric with the spiral flow axis.

21. The fluid mixer as claimed in claim 1, wherein
the second inlet is directed downstream and separated from the wall of the mixing chamber; and/or
the outlet is circular and has a diameter smaller than the diameter of the mixing chamber.

* * * * *